United States Patent Office 2,944,095
Patented July 5, 1960

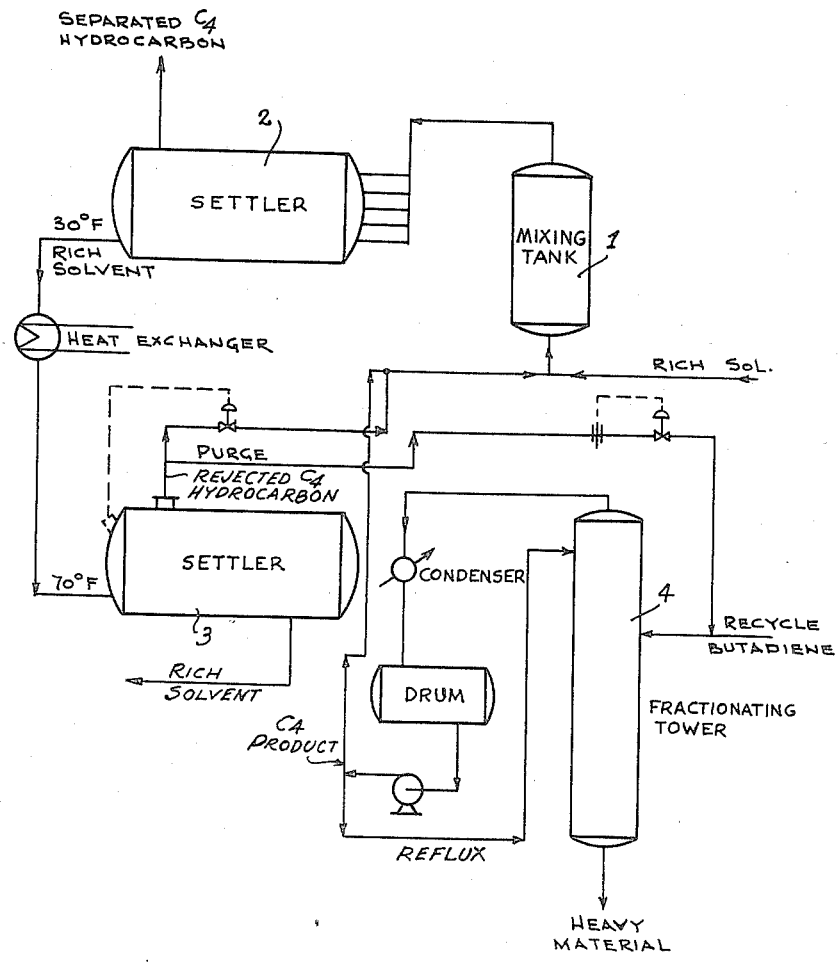

2,944,095

PURIFICATION OF BUTADIENE USING AN AMMONICAL SOLUTION OF COPPER IONS

Peter C. Kupa and Charles M. Finigan, Sarnia, Ontario, Canada, assignors to Polymer Corporation Limited, Sarnia, Ontario, Canada, a corporation of Canada Filed Apr. 23, 1956, Ser. No. 579,980

5 Claims. (Cl. 260—681.5)

This invention relates to the extraction of olefinic hydrocarbons from a mixture of such olefinic hydrocarbons and other olefinic and saturated hydrocarbons. More particularly it relates to the extraction of butadiene-1,3 from a mixture of butadiene-1,3, n-butylene, butanes and isobutylene.

Butadiene-1,3 is now prepared by the dehydrogenation of n-butylene in the presence of certain well-known dehydrogenation catalysts. One such catalyst is the potassium oxide promoted iron oxide catalyst disclosed in United States Patent No. 2,426,829, issued September 2, 1947, to Kenneth K. Kearby. Other catalysts include those in which the active ingredient is calcium nickel phosphate. An example of one such catalyst is the calcium nickel phosphate-chromium oxide catalyst, disclosed in United States Patent No. 2,442,320, issued May 25, 1948, to Andrew J. Dietzler et al. in which the dehydrogenation takes place in the presence of steam. The conversion of n-butylene to butadiene-1,3 is only about 30–50 mole percent and so the reaction products are not pure butadiene-1,3. The product of $C_4$ hydrocarbons contains approximately 18 to 25 weight percent butadiene-1,3. In order to obtain substantially pure butadiene-1,3 it is necessary to separate it from the other components. In one such suitable extraction operation, the liquefied gaseous product is extracted countercurrently with a suitable solvent. Such solvent is generally an ammoniacal solution of copper ions with an anion capable of forming a cuprous salt soluble in such ammoniacal solution. Examples of such anions are sulfate, phosphate, acetate, lactate, tartrate, formate, carbonate, chloride, fluoride, glycolate, nitrate, benzoate, salicylate, etc. Normally such solvent is a solution containing 2–5 moles of cuprous copper, a trace of cupric copper and greater than 10 moles of ammonia, with the anion being acetate. The rich solvent is then sent to a desorber unit where the butadiene-1,3 is flashed off as a vapour and the lean solvent is returned to the extraction system.

It was found that particularly in the last rejection stage of the settler units and, more generally in the settlers between the feed entry settler and the last rejection stage of the settler units, a great deal of entrainment difficulties occurred.

It is therefore an object of this invention to effect the countercurrent extraction of olefinic hydrocarbons from a mixture of such olefinic hydrocarbons and other olefinic and saturated hydrocarbons using an ammoniacal solution of copper ions with an anion capable of forming a cuprous salt soluble in such ammoniacal solution in which such entrainment difficulties are reduced.

A further object is the countercurrent extraction of butadiene-1,3 from a mixture of butadiene-1,3 and other olefinic and saturated hydrocarbons using a copper ammonium acetate solvent in which the entrainment difficulties in the settler train are reduced.

The objects of the present invention are achieved in the liquid phase solvent extraction of an olefin, for example, butadiene-1,3, from a mixture of olefins and saturated hydrocarbons, for example a mixture of butadiene-1,3 and other olefinic and paraffinic four carbon hydrocarbons, wherein the hydrocarbon mixture is intimately contacted with a preferential solvent for said olefin, said solvent comprising an ammoniacal solution of copper ions with an anion capable of forming salts soluble in said ammoniacal solution in a counter-current extraction system comprising a plurality of stages, the solvent passing through the stages in progressively increasing concentration of the olefinic content and the hydrocarbon mixture passing through the stages in progressively decreasing content of the olefin, the solvent for the olefin first being intimately contacted with such hydrocarbon mixture in mixers and then separated in settlers to form a solvent phase and a hydrocarbon phase, the solvent phase in each case after being separated being passed in contact with the hydrocarbon phase having a higher olefin concentration than the hydrocarbon phase from which it was separated, the hydrocarbon phase in each case after being separated being contacted with a solvent phase having a lower olefinic content than the one from which it had been separated in the improvement which comprises withdrawing a portion of such hydrocarbon phase only from a settler of at least one such stage, such settler preferably, but not necessarily, being one which is located between the hydrocarbon feed entry stage and the last stage and including such last stage of the countercurrent extraction system, passing such withdrawn hydrocarbon phase through an apparatus adapted to separate the volatile material from the non-volatile material, for example through a fractionating tower and returning such volatile material to a previous stage in the countercurrent extraction system. Preferably it contemplated the use of either aqueous or aqueous methanolic or aqueous ethanolic solutions of a copper ammonium acetate solvent and withdrawing a portion of the hydrocarbon phase only from at least one settler of such stage, such settler being located between the hydrocarbon feed entry stage and the last stage and including the last stage of the countercurrent extraction system in the direction of flow of the solvent. Most preferably it contemplates the use of either aqueous or aqueous methanolic or aqueous ethanolic solutions of a copper ammonium acetate solvent and withdrawing a portion of the hydrocarbon phase only from the last settler of the countercurrent extraction system.

The problem of entrainment in the extraction described broadly above is a serious one, since it affects the capacity of a plant engaged in the manufacture of olefins, particularly of butadiene-1,3. It is known that entrainment is a symptom of emulsions and hence the capacity of an extraction operation is reduced.

In order to determine the cause of the entrainment and hence to solve the problem, it was necessary to analyse the liquid hydrocarbon at various stages of the overall extraction process. Firstly, the component distribution of the hydrocarbons in the upper end of the settler system, and from other feed streams in the plant were obtained. The methods of analysis used were the accepted infra-red and mass spectrometer methods. The results are given below in Table I.

TABLE I

*Hydrocarbon distribution analyses by infrared and mass spectrometer*

| Sample Drawn From— | propylene | Butane | iso-butylene | butene-1 | cis-butene-2 | trans-butene-2 | buta-diene-1,3 | Allenes | pentanes and higher homologues |
|---|---|---|---|---|---|---|---|---|---|
| Unit Feed | 0.6 | 17.3 | 7.0 | 17.0 | 15.0 | 20.0 | 22.9 | | 0.2 |
| | 0.6 | 24.6 | 54.3 | 54.3 | 54.3 | 54.3 | 20.5 | | |
| Feed Solvent Settler | 0.2 | 24.5 | 55.1 | 55.1 | 55.1 | 55.1 | 20.2 | | |
| | 0.7 | 2.0 | 1.0 | 10.3 | 2.9 | 2.9 | 80.2 | | |
| 9th settler tank | 0.5 | 9.0 | 29.2 | 29.2 | 29.2 | 29.2 | 61.3 | | tr. |
| | 0.8 | 8.8 | 28.3 | 28.3 | 28.3 | 28.3 | 62.1 | | |
| | 0.8 | 10.6 | 7.1 | 16.5 | 8.4 | 6.5 | 50.0 | 0.1 | |
| | 0.5 | 1.2 | | 8.0 | 1.4 | 2.2 | 86.1 | | |
| 10th settler tank | 0.3 | 6.9 | 22.7 | 22.7 | 22.7 | 22.7 | 69.9 | | 0.2 |
| | 0.7 | 5.8 | 19.2 | 19.2 | 19.2 | 19.2 | 74.3 | | |
| | 0.6 | 6.3 | 4.8 | 10.9 | 8.0 | 3.4 | 66.9 | 0.1 | |
| | 0.6 | 0.1 | 0.1 | 8.7 | 1.2 | 1.2 | 89.4 | | 0.1 |
| 11th settler tank | 0.3 | 4.8 | 19.3 | 19.3 | 19.3 | 19.3 | 76.4 | | 0.3 |
| | 0.4 | 4.5 | 13.5 | 13.5 | 13.5 | 13.5 | 81.6 | | |
| | 0.3 | 4.3 | 2.7 | 7.4 | 3.5 | 2.0 | 79.6 | 0.2 | |
| Recycle | 0.7 | 1.0 | 0.6 | 6.2 | 1.8 | 1.8 | 89.7 | | |
| | 0.8 | 1.9 | 1.8 | 6.8 | 1.6 | 1.2 | 84.8 | 1.1 | |

It is seen from this table that there is a high butylene to butadiene-1,3 ratio in all the settler stream samples. It is also evident that there is no indication that there is a build-up of low molecular weight hydrocarbon component contamination in any of the samples examined.

It is known that polymeric acetylenes are entrainment producers under certain circumstances. Hence, distribution data for the alpha-acetylenes were obtained on all streams entering the extraction unit. The method used involved silver nitrate precipitation, followed by regeneration and subsequent determination of the individual acetylenes by the Mass Spectrometer. The data given below in Table II merely shows the acetylene concentrations in the unit feed, recycle stream, a representative settler unit (the 11th settler tank), and the feed to the settlers.

TABLE II

*Acetylene distribution*

| Sample from— | Total p.p.m. | Acetylenes | | |
|---|---|---|---|---|
| | | Methyl | Ethyl (wt. percent of Total) | Vinyl |
| Unit Feed | 285 | 5 | 53 | 42 |
| | 298 | 5 | 54 | 41 |
| Feed to Settlers | 100 | | 90 | 10 |
| | 104 | 5 | 92 | 3 |
| Recycle Stream | 1,530 | 14 | 86 | 1 |
| | 1,640 | 19 | 80 | 1 |
| 11th Settler tank | 145 | 5 | 92 | 3 |

This data indicates that the amount of acetylenes in the feed entering the settlers is only of the order of about 100 parts per million, and that such amounts of acetylenes would not be expected to result in the entrainment difficulties encountered.

The non-volatile, hydrocarbon soluble, material from the settler units was then determined. Such non-volatile, hydrocarbon soluble material is herein defined as the residue from the distillation, at 30° C., of a sample of the hydrocarbon. The results are shown in Table III which compares the analyses of the unit firstly 7 years ago and secondly three months ago.

TABLE III

*Hydrocarbon soluble non-volatile material in the butadiene-1,3 extraction settler system*

| Settler Tank from which Sample Drawn | Hydrocarbon Soluble Polymer Weight Percent | |
|---|---|---|
| | 7 years ago | three months ago |
| 11th | 0.050 | 1.0 |
| 10th | 0.020 | 0.29 |
| 9th | 0.013 | 0.20 |
| 5th | 0.012 | 0.056 |
| 1st | 0.001 | 0.029 |

These results show that there is an increase in the percentage of the non-volatile, hydrocarbon soluble material in the settler train at the present time over the amounts present seven years ago. Particularly, it is noticed that the amount of such material in the 11th settler tank of the settler train (i.e. in the ultimate unit) increased twenty-fold from 0.050% seven years ago to 1.0% at the present time. The other increases are of a minor nature.

The non-volatile, hydrocarbon soluble material was then tested to determine whether it had any effect on the emulsion formation tendency of the copper ammonium acetate solvent. As was stated above, entrainment is a symptom of emulsion formation in the extraction system. The effect of the non-volatile, hydrocarbon material on the emulsoin times is given below in Table IV. The term "emulsion time" is herein defined as the time, in seconds, required for one-half of the hydrocarbon to separate from the solvent after being emulsified, under controlled conditions of volume, temperature, and agitation, with a suitable solvent, selective for the hydrocarbon being absorbed. The common solvent contemplated is copper ammonium acetate.

TABLE IV

*Effect of hydrocarbon soluble polymer removed from the 11th settler tank by flash distillation on copper ammonium acetate solvent emulsion times*

| Sample | Emulsion Time (seconds) |
|---|---|
| Lean Solvent+Spent C₄ | 125 |
| Lean Solvent+Spent C₄+1% Non-volatile Material from the 11th settler tank | 270 |

Since the increased solvent emulsion times are indicative of increased entrainment in the unit settler system, it is evident that the cause of the entrainment difficulties is such non-volatile material.

Attention was then directed to a suitable manner of removing the non-volatile material from the settler train. Two methods were tried: A sample of the feed from the 11th settler tank was flash distilled and condensed in a Dry-Ice trap; a second sample of the feed from the 11th settler tank was agitated at 10° F. for three hours with 1% and 5% quantities of granulated activated charcoal. The results are given below in Table V.

TABLE V

Removal of hydrocarbon soluble polymer from the 11th settler tank

| (a) By Flash Distillation | Non-Volatile Material (wt. percent) |
|---|---|
| as Received | 1.41 |
| Flash distilled | 0.020 |

| (b) By Charcoal Adsorption (Exhaustive Treatment at 10° F.) | Non-Volatile Material (wt. percent) |
|---|---|
| as Received | 1.41 |
| Treated with 1% activated charcoal | 0.70 |
| Treated with 5% activated charcoal | 0.47 |

It is evident that this non-volatile material may be successfully and feasibly removed by flash distillation but not by adsorption on activated charcoal. Thus, it was discovered that the cause of the entrainment difficulties was the concentration of a non-volatile material in the last units of the settler train, i.e. in those units between the hydrocarbon feed inlet and rich solvent outlet. It was found that if such non-volatile material was removed from the settler chain entrainment difficulties in such units of the settler train were very greatly decreased. The actual manner of removing such non-volatile material is a matter of convenience, with the most desirable method being dependent upon the operating details of the plant. However, since flash distillation has been found to be suitable, it is used in the preferred embodiment of the present invention.

Thus, in the present case, the preferred embodiment consists in a side stream of rejected hydrocarbon being drawn off from the 11th settler tank (i.e. the last unit) to a recycle rerun tower and the distillate recycled to the 10th mixer-settler unit (i.e. the penultimate unit). This has resulted in a substantial drop in the amount of non-volatile material in the 11th settler tank. This, in turn, has produced a significant improvement in the overall settler operation.

The preferred embodiment of the invention is shown diagrammatically in the figure.

In the figure the rich solvent, i.e. solvent containing dissolved hydrocarbon, passes from the antepenultimate settler of the countercurrent extraction chain through a mixing tank 1 and thence to the 10th settler tank, i.e. the penultimate stage 2, where the undissolved hydrocarbon is allowed to separate from the solvent. Rich solvent eventually flows to the last stage, a rejection settler 3. A purge of the rejected hydrocarbon phase from 3 enters a recycle fractionating tower 4 along with recycle butadiene-1,3 feed. This recycle fractionating tower fractionally distills the mixture of hydrocarbons, whereby the fractions, heavier than C₄ components, are removed. (In this specification a heavier fraction is defined as a hydrocarbon fraction with a molecular weight greater than that of a $C_4$ hydrocarbon.) The butadiene-1,3 fraction from the recycle fractionating tower is then recycled to the penultimate unit mixing tank mixer 1. The heavier fraction including the undesirable emulsion forming non-volatile material is removed from the bottom of recycle fractionating tower 4.

The analyses of non-volatile material from the 9th, 10th and 11th settler tanks over a twenty-one day period are given below in Table VI. Prior to this controlled experiment, intermittent purging was done, and so the amount of non-volatile material in the 11th settler tank was reduced from 1.0%, as shown in Table III to the 0.47% as shown after 0 days in Table VI.

TABLE VI

| No. of Days | | Settler Tank | | |
|---|---|---|---|---|
| | | 9th | 10th | 11th |
| 0 | Wt. percent non-volatile material | 0.47 | 0.39 | 0.47 |
| 5 | do | 0.34 | 0.28 | 0.50 |
| 21 | do | 0.17 | 0.16 | 0.35 |

These results indicate that the purging from the 11th settler tank is lowering the general level of non-volatile material in the entire settler train. Furthermore, it would appear from the above results that it is not until most of the polymer has been removed from the other settlers in the train that there will be a major drop in the non-volatile material content of the 11th settler tank.

Some preliminary work has been done in an attempt to identify the non-volatile material which causes entrainment difficulties, but to date no definite identification has been made. Hence, applicants do not wish to be limited to the removal of any particular material from the settler chain.

The non-volatile material was subjected to molecular distillation and the fractions so obtained were examined by Infrared and Mass Spectrometer. The results are given below in Table VII.

TABLE VII

Molecular distillation of non-volatile material removed from the 11th settler overhead with infrared and mass spectrometer examination

| Fraction | Boiling Point, °C. | Physical Appearance at Room Temperature | Optical Examination |
|---|---|---|---|
| 1 | <30 | gas | <1% of total non-volatile material—a variety of phenyl allanes and alkanes. |
| 2 | 30–100 | pale, yellow liquid | infra red adsorption bands not detectable in original nonvolatile material; very small fraction. |
| 3 | 100–160 | viscous yellow material. | infra red adsorption bands similar to original non-volatile material; very small fraction. |
| 4 | >160 | dark brown resin. | This was the distillation residue which made up over 80% of the total non-volatile material. |

It is seen from the table that the composition of such non-volatile material is exceedingly complex. Thus, no definite identification has been made.

What we claim is:

1. In the liquid phase solvent extraction of butadiene-1,3 from a hydrocarbon feed consisting of a mixture of butadiene-1,3 and other olefinic and paraffinic four carbon hydrocarbons wherein the hydrocarbon mixture is intimately contacted with a preferential solvent for said butadiene-1,3, said solvent comprising an ammoniacal solution of copper ions with an anion capable of forming salts soluble in said ammoniacal solution in a countercurrent extraction system comprising a plurality of stages, the solvent passing through the stages in progressively increasing concentration of the butadiene-1,3 content and the hydrocarbon mixture passing through the stages in progressively decreasing content of the butadiene-1,3 the solvent for the butadiene-1,3 first being intimately contacted with the said hydrocarbon mixture in mixers and then separated in settlers to form a solvent phase and a hydrocarbon phase, the improvement which comprises the steps in sequence of: (1) withdrawing a purge stream of the hydrocarbon phase only from a settler of any stage in said system, such stages being designated with reference to the direction of the solvent flow subsequent to the point at which the hydrocarbon feed enters the system; (2) fractionating said hydrocarbon purge stream to separate the volatile material from the non-volatile material; and (3) recycling the volatile material to a previous stage in the countercurrent extraction system.

2. In the liquid phase solvent extraction of butadiene-1,3 from a hydrocarbon feed consisting of a mixture of butadiene-1,3 and other olefinic and paraffinic four carbon hydrocarbons wherein the hydrocarbon mixture is intimately contacted with a preferential solvent for said butadiene-1,3, said solvent comprising ammoniated aqueous copper acetate in a countercurrent extraction system comprising a plurality of stages, the solvent passing through the stages in progressively increasing concentration of the butadiene-1,3 content and the hydrocarbon mixture passing through the stages in progressively decreasing content of the butadiene-1,3, the solvent for the butadiene-1,3 first being intimately contacted with the said hydrocarbon mixture in mixers and then separated in settlers to form a solvent phase and a hydrocarbon phase, the improvement which comprises the steps in sequence of: (1) withdrawing a purge stream of the hydrocarbon phase only from a settler of any stage in said system, such stages being designated with reference to the direction of the solvent flow subsequent to the point at which the hydrocarbon feed enters the system; (2) fractionating said hydrocarbon purge stream to separate the volatile material from the non-volatile material; and (3) recycling the volatile material to a previous stage in the countercurrent extraction system.

3. In the liquid phase solvent extraction of butadiene-1,3 from a hydrocarbon feed consisting of a mixture of butadiene-1,3 and other olefinic and paraffinic four carbon hydrocarbons wherein the hydrocarbon mixture is intimately contacted with a preferential solvent for said butadiene-1,3, said solvent comprising ammoniated aqueous copper acetate, in a countercurrent extraction system comprising a plurality of stages, the solvent passing through the stages in progressively increasing concentration of the butadiene-1,3 content and the hydrocarbon mixture passing through the stages in progressively decreasing content of the butadiene-1,3, the solvent for the butadiene-1,3 first being intimately contacted with the said hydrocarbon mixture in the mixers and then separated in settlers to form a solvent phase and a hydrocarbon phase, the improvement which comprises the steps in sequence of: (1) withdrawing a portion of such hydrocarbon phase only from a settler of the last stage of said system, such stages being designated with reference to the direction of the flow of solvent; (2) passing such withdrawn hydrocarbon phase through an apparatus adapted to separate the volatile material from the non-volatile material; and (3) returning such volatile material to the penultimate stage of the countercurrent extraction system.

4. In the liquid phase solvent extraction of butadiene-1,3 from a hydrocarbon feed consisting of a mixture of butadiene-1,3 and other olefinic and paraffinic four carbon hydrocarbons wherein the hydrocarbon mixture is intimately contacted with a preferential solvent for said butadiene-1,3, said solvent comprising ammoniated aqueous copper acetate, in a countercurrent extraction system comprising a plurality of stages, the solvent passing through the stages in progressively increasing concentration of the butadiene-1,3 content and the hydrocarbon mixture passing through the stages in progressively decreasing content of the butadiene-1,3, the solvent for the butadiene-1,3 first being intimately contacted with the said hydrocarbon mixture in mixers and then separated in settlers to form a solvent phase and a hydrocarbon phase, the improvement which comprises the steps in sequence of: (1) withdrawing a portion of such hydrocarbon phase only from a settler of the last stage of said system, such stages being designated with reference to the direction of flow of the solvent; (2) passing such withdrawn hydrocarbon phase through a fractionating tower in order to separate the volatile material from the non-volatile material; and (3) returning such volatile material to the penultimate stage of the countercurrent extraction system.

5. In the liquid phase solvent extraction of butadiene-1,3 from a hydrocarbon feed consisting of a mixture of butadiene-1,3 and other olefinic and paraffinic four carbon hydrocarbons wherein the hydrocarbon mixture is intimately contacted with a preferential solvent for said butadiene-1,3, said solvent comprising ammoniated aqueous alcoholic copper acetate in which the alcohol is selected from the group consisting of methanol, ethanol and propanol, in a countercurrent extraction system comprising a plurality of stages, the solvent passing through the stages in progressively increasing concentration of the butadiene-1,3 content and the hydrocarbon mixture passing through the stages in progressively decreasing content of the butadiene-1,3, the solvent for the butadiene-1,3 first being intimately contacted with the said hydrocarbon mixture in mixers and then separated in settlers to form a solvent phase and a hydrocarbon phase, the improvement which comprises the steps in sequence of: (1) withdrawing a portion of such hydrocarbon phase only from a settler of the last stage of said system, such stages being designated with reference to the direction of flow of the solvent; (2) passing such withdrawn hydrocarbon phase through a fractionating tower in order to separate the volatile material from the non-volatile material; and (3) returning such volatile material to the penultimate stage of the countercurrent extraction system.

References Cited in the file of this patent

UNITED STATES PATENTS

| 2,459,451 | Packie et al. | Jan. 18, 1949 |
| 2,472,487 | Lovell | June 7, 1949 |

FOREIGN PATENTS

| 487,290 | Canada | Oct. 14, 1952 |